(12) United States Patent
Takahashi

(10) Patent No.: US 6,358,555 B1
(45) Date of Patent: Mar. 19, 2002

(54) PROCESS FOR PRODUCING FROZEN AVOCADOS

(76) Inventor: Hideyuki Takahashi, 15111 Romero Pl., North Hills, CA (US) 91343

( * ) Notice: Subject to any disclaimer, the term of this patent is extended or adjusted under 35 U.S.C. 154(b) by 0 days.

(21) Appl. No.: 09/545,723

(22) Filed: Apr. 8, 2000

Related U.S. Application Data

(63) Continuation-in-part of application No. 09/282,890, filed on Mar. 31, 1999, now abandoned.

(51) Int. Cl.⁷ .............................. A23B 4/06; A23B 4/08; A23B 4/12; A23L 1/272
(52) U.S. Cl. ................... 426/615; 426/270; 426/521; 426/524; 426/626
(58) Field of Search ............................... 426/615, 626, 426/521, 524, 270

(56) References Cited

U.S. PATENT DOCUMENTS 2,373,521 A * 4/1945 Wigelsworth ............... 426/520
2,531,431 A * 11/1950 Hills ........................... 426/615
4,701,330 A * 10/1987 Rogers et al. ............... 426/615
4,753,808 A *  6/1988 Orr et al. ..................... 426/615

FOREIGN PATENT DOCUMENTS

JP            294738 A   * 12/1988

* cited by examiner

*Primary Examiner*—Helen Pratt
(74) *Attorney, Agent, or Firm*—Muramatsu & Associates

(57) ABSTRACT

A process for producing frozen avocados which will not easily disintegrate or discolor on and after thawing or defrosting. The process includes the steps of cutting avocados into a plurality of pieces and removing seeds from bodies of the pieces, heating the avocado pieces in a steam tank by application of steam, removing the avocado pieces from the steam tank, and freezing the avocado pieces quickly at an ultra-low temperature. Preferably, certain additives such as baking powder, vinegar, salt, wine and the like are provided to the avocado pieces before heating the avocados by the steam. Also, the heated avocado pieces should be cooled and dried prior to freezing.

4 Claims, 4 Drawing Sheets

PROCESS FOR PRODUCING FROZEN AVOCADOS

This is a continuation-in-part of U.S. patent application Ser. No. 09/282,890 filed on Mar. 31, 1999, now abandoned.

FIELD OF THE INVENTION

This invention relates to a process for producing frozen fruits, and more particularly to a process for producing frozen avocados which will not easily disintegrate or discolor on and after thawing.

BACKGROUND OF THE INVENTION

Since it is difficult to maintain the quality of avocados for a long period of time, they must be consumed in a relatively short period of time after being harvested. That is one of the primary reasons why avocados are expensive in the market. In order to solve this problem, many methods have been proposed for preservation of avocados so far.

As a general method for preservation of fruits and vegetables, quick ultra-low temperature freezing is widely used. This preservation method can be successfully applied to those products such as broccoli, carrots and the like and they are sold on the market as frozen foods. However, it is difficult to apply such a quick ultra-low temperature freezing method to those high-water content products such as tomatoes, oranges or watermelons and the like because they disintegrate upon thawing (defrosting).

Avocados, although not as much as watermelons or tomatoes, contain relatively a large amount of water and are delicate to outside stimulation. Therefore, when ultra-low temperature freezing is conducted to avocados, they are easily disintegrated upon thawing. In addition, the surface of the frozen avocados is discolored upon thawing or defrosting owing to oxidization of the surface of the avocados. Because of these problems, avocados are not widely used as frozen foods today.

In order to solve these problems, dehydration of avocados by heat drying prior to freezing is proposed. Such dehydration can be conducted by means of a hot air or microwave treatment. These methods can be effectively applied to avocados for the purpose of maintaining the shape of frozen avocados upon thawing. However, employing such a method requires another facility and additional expense for that purpose. In addition, because the water content and size of each avocado varies widely, it is difficult to uniformly dehydrate all of the avocados to an appropriate degree by these methods.

With respect to the problem of discoloration on and after thawing, anti-browning agent such as citric acid has been used. However, in order to prevent the discoloration by such an anti-browning agent, a substantial amount of such agent must be used, resulting in further cost increase in producing frozen avocados.

Further, in order to successfully produce the frozen avocados, the taste of avocados should not be impaired by the freezing process.

SUMMARY OF THE INVENTION

Therefore, it is an object of the present invention to provide a process for producing frozen avocados which do not disintegrate upon thawing in a simple and economical manner.

It is another object of the present invention to provide a method for producing frozen avocados which do not discolor on and after thawing.

It is a further object of the present invention to provide a method for producing avocados which can maintain the original good taste.

Further object of the present invention is to provide a method for producing frozen avocados capable of performing the continuous processing for freezing including cutting, boiling, cooling, drying, quick ultra-low temperature freezing in a successive and economically efficient manner.

The present invention is a process for producing frozen avocados which can achieve the above objects effectively, comprising the steps of;

cutting avocados into a plurality of pieces and removing seeds from the body of each of the avocado pieces;

heating the avocado pieces in a steam container by introducing steam thereto;

removing the avocado pieces from the steam container; and freezing the avocado pieces by a quick ultra-low temperature freezer.

Preferably, the avocado pieces removed from the steam container are subsequently cooled in ice water and dried for a certain period of time prior to the ultra-low temperature freezing.

More preferably, prior to the drying, the skin of the avocado pieces is removed.

More preferably, a certain amount of baking powder is added to the hot water in order to maintain the clear color of avocado pieces after freezing.

More preferably, a certain amount of vinegar or salt is added to the hot water in order to prevent the oxidization of the avocado pieces on and after thawing.

More preferably, a certain amount of sugar, Japanese sake or wine is added to the hot water in order to maintain the taste of the avocado pieces in good condition.

According to the present invention, since avocado pieces are heated by the steam in a large container, the water content of the avocado pieces is uniformly dehydrated through the heating process in a very easy and economically efficient manner without using any additional facility for that purpose.

Further, according to the present invention, since the avocado pieces are uniformly dehydrated through the process of heating and drying prior to the ultra-low temperature freezing, disintegration of the avocado pieces upon thawing is prevented.

Further, according to the preferred embodiment of the present invention, since avocado pieces are cooled in the ice water after heating but prior to ultra-low temperature freezing, the discoloration of the avocado pieces after thawing can be effectively prevented.

Further, according to the preferred embodiment of the present invention, since baking powder is added to the avocado pieces before heating by the steam, dehydration of avocado pieces is promoted and the clear color of the avocado pieces is maintained.

Further, according to the preferred embodiment of the present invention, since anti-oxidization agent such as vinegar or salt is added to the avocado pieces through the heating process, the anti-oxidization agent is effectively applied to the avocado pieces so that the discoloration of the avocado pieces after thawing can be effectively prevented without using any additional facility or independent process for that purpose.

Further, according to the preferred embodiment of the present invention, since wine, Japanese sake or sugar is added to the avocado pieces, the bitter taste of avocado pieces after thawing can be removed without using any facility or process for that purpose.

DETAILED DESCRIPTION OF THE INVENTION

Figure 1:
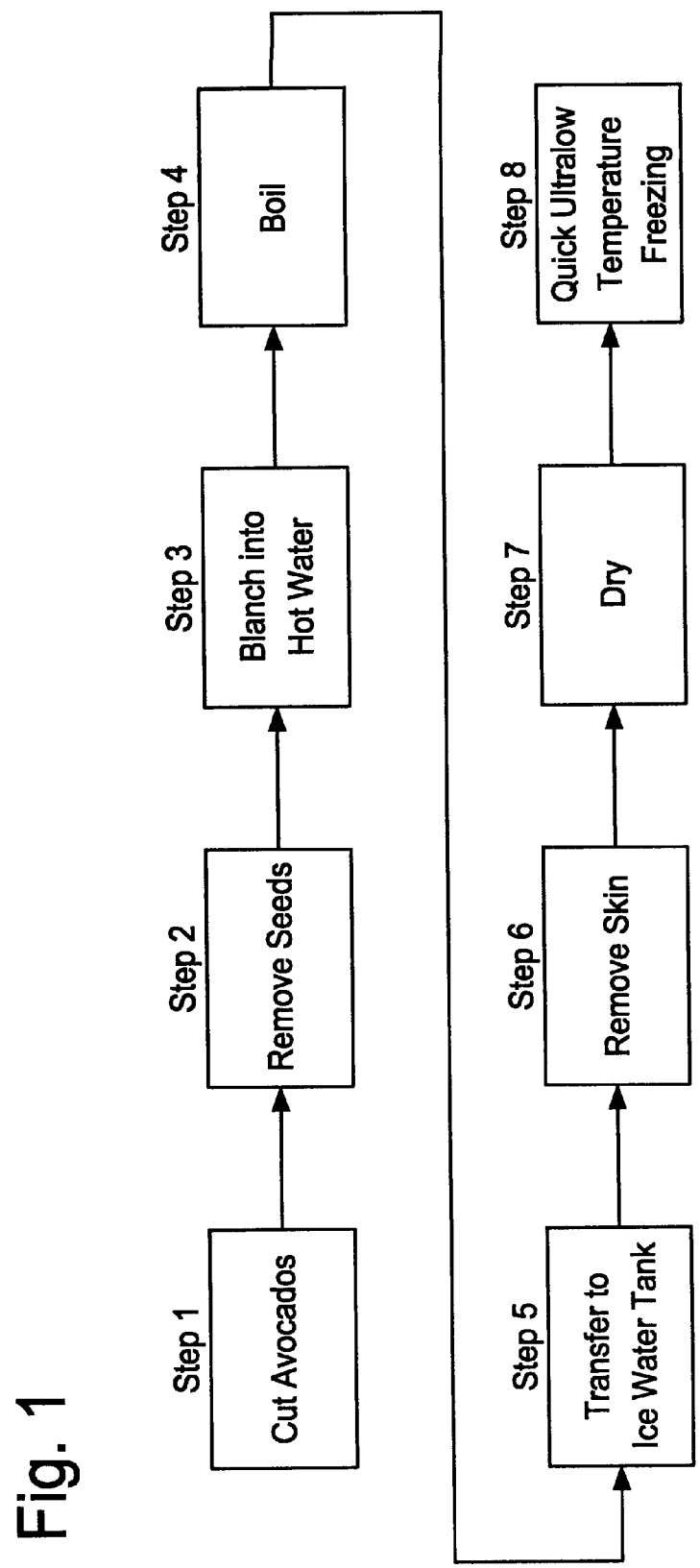
FIG. 1 is a flow chart of producing the frozen avocado according to the present invention.

Referring now to the drawings, the process for producing the frozen avocado is explained in detail.

Figure 2:
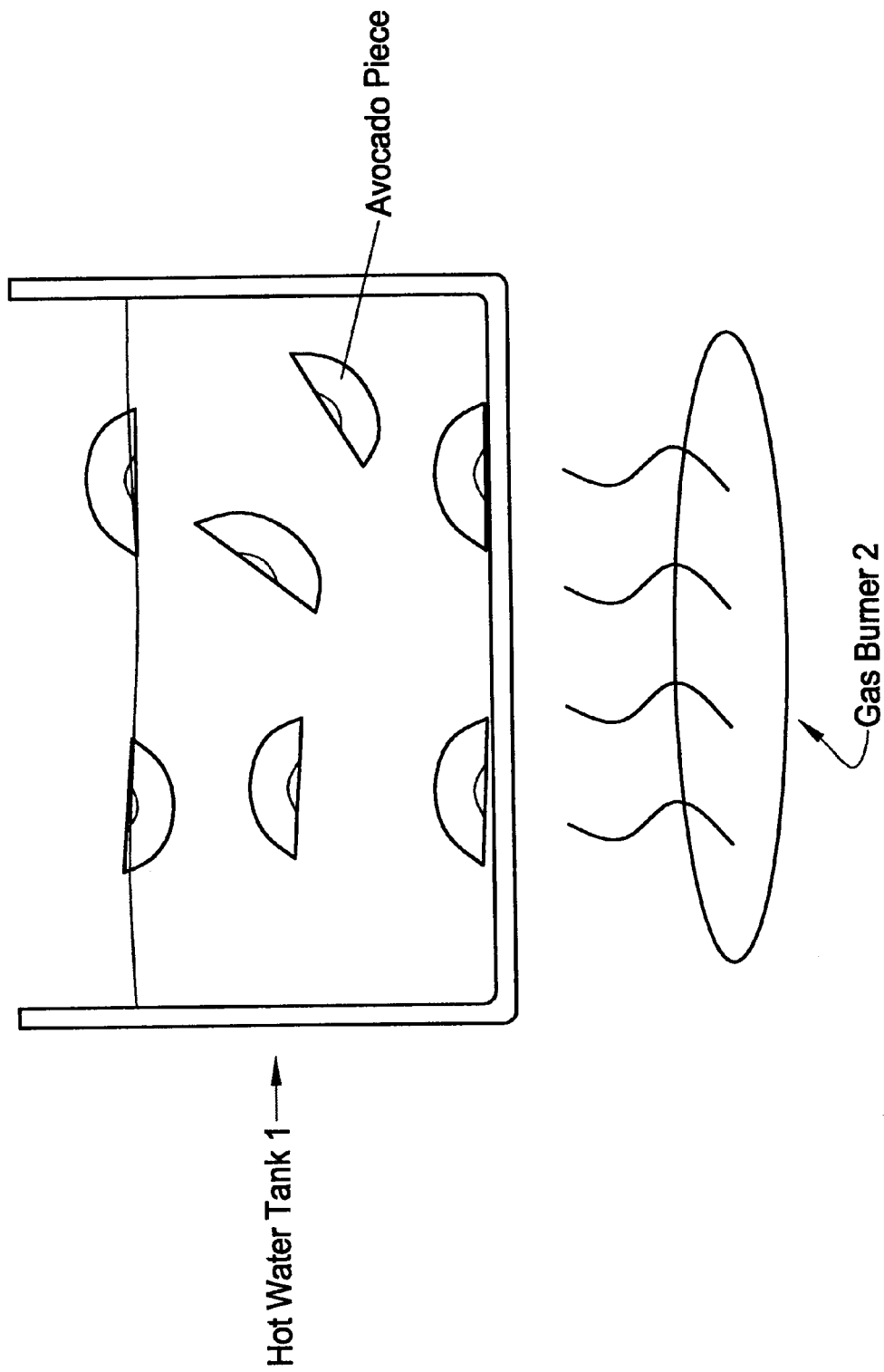
FIG. 2 is a schematic diagram showing the boiling process of the avocado pieces according to the present invention.

FIG. 1 is a flow chart of producing the frozen avocado according to the present invention. FIG. 2 is a explanatory drawing showing the boiling process of the avocado pieces according to the present invention, especially the process that the boiled avocado pieces are rising toward the surface of the hot water.

First, a plurality of avocados which are not completely matured are selected and cut in half by using a cutting knife (FIG. 1. Step 1). If the avocados selected are completely matured, the produced frozen avocado pieces tend to disintegrate upon thawing. Avocados may be cut into three or more pieces as far as the size of the cut pieces are feasible for subsequent use. The avocado pieces cut in half are removed the seeds from the body. If the seeds are not removed from the body, the avocado pieces may not rise to the surface of the hot water during the course of the boiling process owing to the heavy weight of the seeds.

Next, those half cut avocado pieces are blanched into the hot water (FIG. 1, Step 2). The temperature of the hot water is preferably around the boiling point. If the temperature is higher than the boiling point, the frozen avocado pieces tend to disintegrate upon thawing. If the temperature is lower than the boiling point, it takes longer time to boil the avocado pieces and dehydration of the avocado pieces may become insufficient.

Boiling in the hot water for about 4–5 minutes (FIG. 1, Step 4), the boiled avocado pieces begin to rise toward the surface of the hot water starting from the smaller ones to the heavier ones successively (FIG. 2).

Upon rising to the surface of the hot water, the boiled avocado pieces are removed from the hot water and put into the cooling water tank which is filled with ice water, the temperature of which is maintained around 32° F.(FIG. 1, Step 5).

After cooling the avocado pieces for about 5–6 minutes, the avocado pieces are taken from the cooling water tank for removal of the skin (FIG. 1, Step 6). After undergoing the boiling and subsequent cooling processes, the surface of avocado pieces becomes soft. Therefore, removal of the skin at this timing is much easier than before.

Next, after wiping off the water remained on the surface of the avocado pieces, those cooled avocado pieces are placed in a quiet place at the normal temperature about 10 minutes for drying (FIG. 1, Step 7). By this drying process, the water contained near the surface of the avocado pieces are appropriately dehydrated without using any additional facility for that purpose.

After going through the foregoing steps, the avocado pieces are frozen by using a quick ultra-low temperature freezer (FIG. 1, Step 8). The preferable temperature for freezing the avocado pieces is from −10° F. to −110° F., and more preferably from −70° F. to −100° F. If the temperature is too low, the avocado pieces cannot endure such low temperature and cracks or fissures might be caused. If the temperature is too high, it takes too much time to freeze resulting in an inefficient operation.

After freezing, the frozen avocado pieces are sold to food processors. Food processors then thaw out the frozen avocado pieces to use them as the material of some food such as California Rolls.

The frozen avocados produced by conventional methods easily disintegrate and discolor rapidly at the time of thawing or they are very expensive. However, the frozen avocado pieces produced according to the present invention are inexpensive and can preserve their integration, shape and color for almost about one week after thawing. Moreover, the taste of the avocado pieces thus produced is maintained in a good condition.

EXAMPLE 1

A water tank 1 filled with water of one gallon is heated by a gas burner 2 and the temperature of the water is raised up to the boiling point. Next, six avocados (Hass species), which are not completely matured, are collected and cut in half and removed seeds from the body by a cutting knife. Then, they are blanched into the hot water (FIG. 2).

After boiling the avocado pieces in the water tank for about 4–5 minutes, the avocado pieces began to rise to the surface of the water successively starting from the smaller ones to the larger ones. It was observed that an infinite number of tiny air bubbles were being generated from the surface of the avocado pieces. According to the knowledge of the inventor of the present invention, it is assumed that, owing to the boiling of the avocado pieces, the natural water contained in the inner body of the avocado pieces is changed into steam and discharged outside of the body through the outer skin of avocado.

Thereafter, those avocado pieces floating at the surface of the hot water are removed from the tank and are transferred to the cooling water tank filled with ice water to cool them about 5–6 minutes. At this time, it was observed that the color of the avocado pieces momentarily changed into a clearer color.

After completing the cooling treatment of the avocado pieces, removed the skin from the body. Thereafter, freeze the avocado pieces by a quick ultra-low temperature freezer at −90° F.

After completing the quick freezing, the avocado pieces are taken from the freezer and transferred to a cool room where the temperature is maintained at about 40–45° F. and observed the subsequent change of the frozen avocado pieces.

The result of above experiment was as follows:

With respect to the shape of the avocado pieces, it was observed that the original shape of each avocado pieces was preserved on and after thawing.

With respect to the color, no significant change was observed until seven days later. Thereafter, the surface of the avocado pieces became gradually blackened owing to oxidization.

The taste of the thawed avocado pieces was good enough for eating. But some of the avocado pieces which had not been matured enough had a little bitter taste.

EXAMPLE 2

Same experiment was conducted under the same condition as that of Example 1, except that 0.5 ounce of baking powder and two ounce of vinegar and one ounce of salt were added to the hot water and stirred.

The result was almost the same as that of the Example 1 except that the color of avocado pieces was maintained to be clearer than the color of the avocado pieces of Example 1.

In addition, with respect to discoloration after thawing, some of the avocado pieces preserved their color one or two days longer than the avocado pieces of Example 1.

EXAMPLE 3

Same experiment was conducted under the same condition except that 0.1 ounce of Japanese sake and one ounce of sugar were added to the hot water.

The result was the same as that of example 2 except that the bitter taste of some avocado pieces disappeared.

Comparative Example 1

Prepared same kind of six avocado pieces, cut in half and immediately freeze them by a quick ultra-low temperature freezer at −90° F. Thereafter put them in a cool room at the temperature of about 40–45° F. and observed the change of the shape and color.

The result was that upon thawing the avocado pieces, disintegration occurred to the avocado pieces a great deal so that the original shape of the avocado pieces was not preserved. Also, upon thawing the avocado pieces in a few hours, discoloration occurred to the avocado pieces and blackened rapidly.

In the second aspect of the present invention, the dehydration process noted above is performed by applying steam to the avocado pieces rather than the boiled water. The advantage of this method is that a large container can be used as a steam tank for receiving a large amount of avocado pieces and the dehydration effect is achieved by sending a relatively small amount of steam to the steam container, thereby improving overall productivity in producing the frozen avocados.

Figure 3:
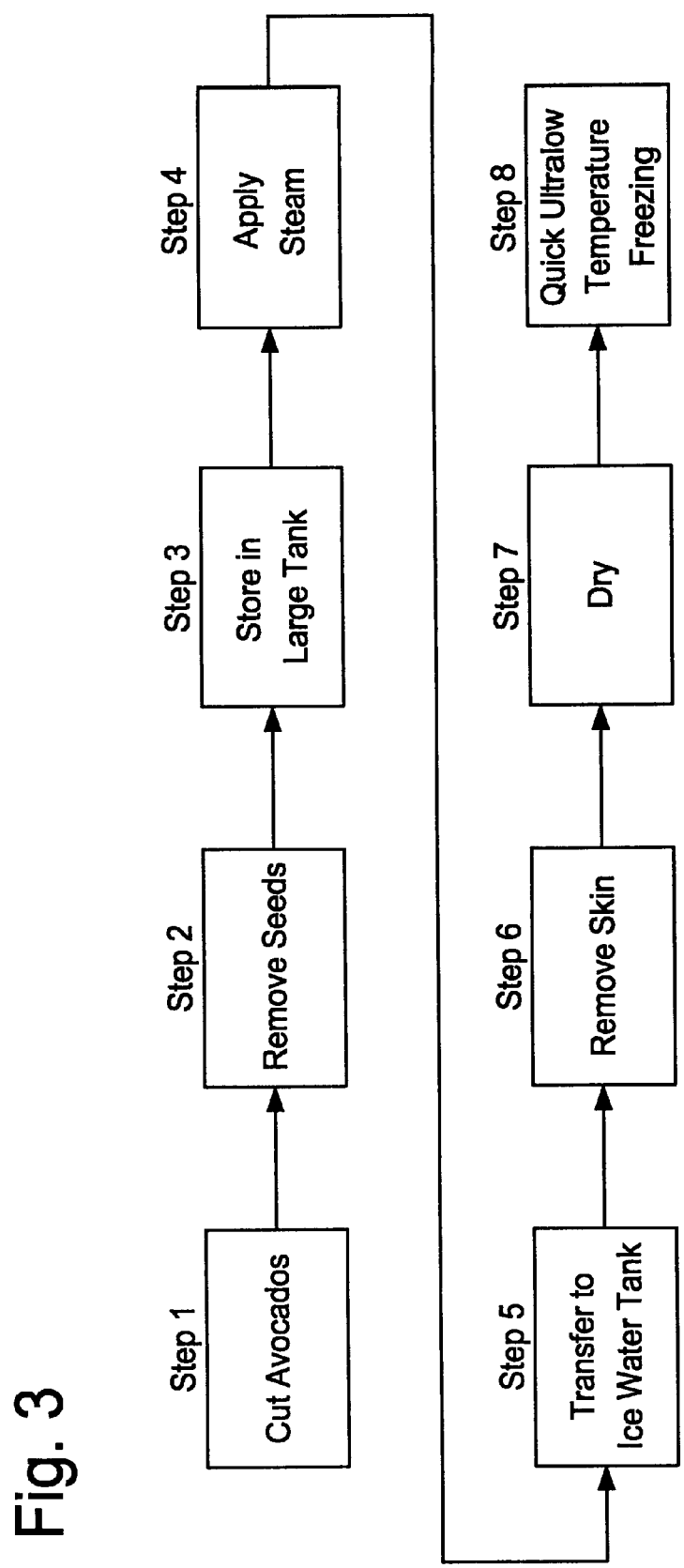
FIG. 3 is a flow chart of producing the frozen avocado according to the second aspect of the present invention.
Figure 4:
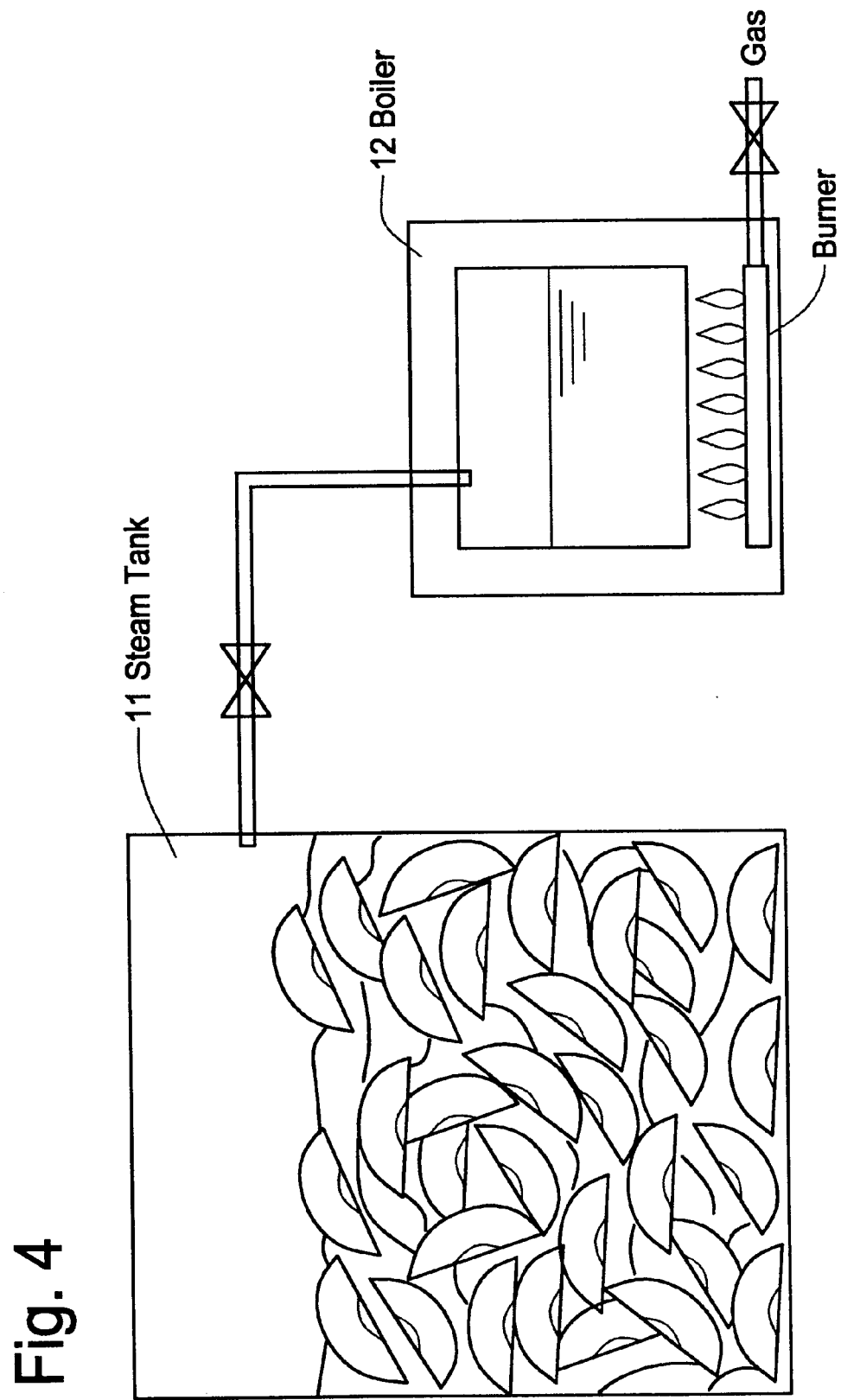
FIG. 4 is a schematic diagram showing the heating process of the avocado pieces according to the second aspect of the present invention.

FIG. 3 is a flow chart of producing the frozen avocados employing the steam heating process according to the second aspect of the present invention, and FIG. 4 schematically shows an example of facility to be used in the steam heating process of FIG. 3.

In the flow chart of FIG. 3, only the steps 3 and 4 are different from the process of FIG. 1. In the step 3, of FIG. 3, the avocado pieces are stored in a steam tank which is a large container to receive steam through a steam pipe. In the step 4, the steam is applied to the avocados in the steam tank. The steam tank can be made much larger in its capacity than that of the boiling water tank of FIG. 2. Thus, a large amount of avocado pieces can be process at the same time, thereby increasing the dehydration efficiency.

As shown in FIG. 4, the avocado pieces are provided in a steam tank 11 where the steam is introduced from a boiler 12 through a steam pipe. Because the steam reaches any avocado pieces equally and quickly, the dehydration process can be completed within a short period of time. For example, in the experiment, a sufficient dehydration effect was obtained by applying the steam to the steam tank 11 for a period of about 4 minutes, which is even shorter than the boiling process of FIG. 1.

Preferably, in the steam heating process, when storing the avocado pieces in the steam tank 11, baking power is equally applied to the avocado pieces before introducing the steam into the steam tank. As a result of application of the baking powder, dehydration of avocado pieces is promoted and the clear color of the avocado pieces is maintained.

Similar to the first aspect of the present invention noted above, anti-oxidization agents such as vinegar or salt is preferably added to the avocado pieces through the heating process for minimizing the discoloration of the avocado pieces after thawing. Further in the foregoing, before the application of the steam, wine or Japanese sake or sugar may be applied to the avocado pieces for removing the bitter taste of avocado pieces after thawing.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A process for producing frozen avocados, comprising the steps of:
   cutting avocados into a plurality of pieces and removing seeds from bodies of said pieces;
   adding a predetermined amount of baking powder and anti-browning agent comprising vinegar and salt to the avocado pieces in a steam tank;
   adding a predetermined amount of Japanese sake, sugar or wine to the avocado in the steam tank;
   heating said avocado pieces by introducing steam into the steam tank;
   removing said avocado pieces from said steam tank; and
   freezing said avocado pieces quickly at an ultra-low temperature.

2. A process for producing frozen avocados as described in claim 1, further comprising the steps of;
   cooling said avocado pieces in ice water after said steam heating; and
   subsequently drying said avocado pieces at a normal temperature prior to said freezing.

3. A process for producing frozen avocados as described in claim 2 further comprising the step of removing skins of said avocado pieces after said cooling of said avocado pieces.

4. A process for producing frozen avocados as described in claim 1, wherein said freezing is conducted at a temperature from −70° F. to −100° F.

* * * * *